H. G. WEIBLING.
Axle Box.
No. 37,479.
2 Sheets—Sheet 1.
Patented Jan'y 20, 1863.
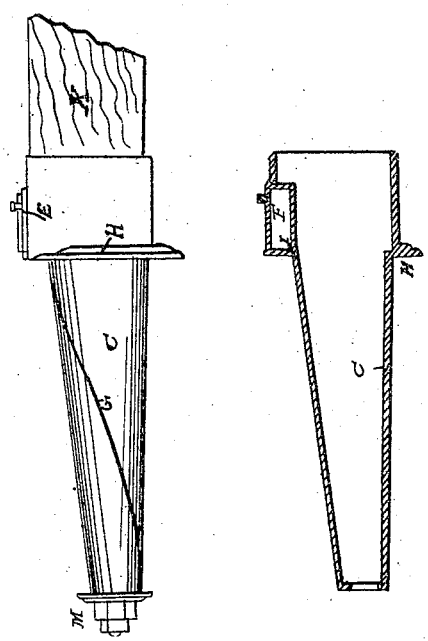
Witnesses
Almon Dibble
Henry S. Lathrop
Inventor
Harmon G. Weibling

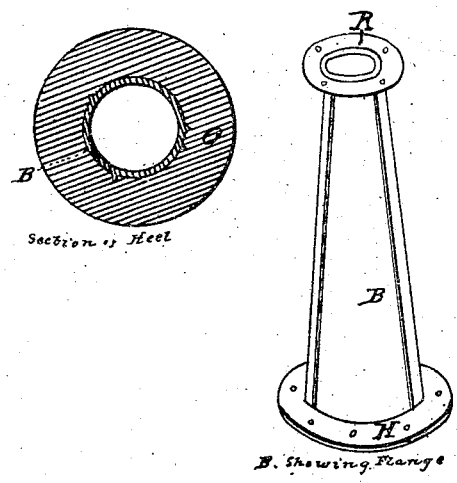

UNITED STATES PATENT OFFICE.

HARMON G. WEIBLING, OF DENVER CITY, COLORADO TERRITORY.

IMPROVEMENT IN AXLES.

Specification forming part of Letters Patent No. 37,479, dated January 20, 1863.

*To all whom it may concern:*

Be it known that I, HARMON G. WEIBLING, of Denver city, Colorado, have invented an Improvement in Method of Lubricating Carriage-Axles, of which the following is a specification.

The improvement: The peculiar construction of the boxes or thimbles and their attachments to the axles, having a lubricator at the shoulder connected with spiral grooves running the entire length of the spindle and friction-rollers inserted in its under side.

The improvements consist in having at the shoulder of the axle an oil-chamber or fountain, $f$, from which oil or other lubricating matter will flow through the aperture $l$ into the spiral groove $g$, thus distributing the lubricator over the whole length of the axle from the shoulder to the point, and obviating the necessity of taking off the wheel to oil the spindle or axle.

The friction-rollers $e\,e$, placed in two grooves cut in the lower side of the spindle $c$ and resting on the pipe or box $b$, also the friction-rollers $e'\,e'$ in the shoulder $h$ and in the burr or nut $m$, the rollers in each case resting upon Babbitt metal, which will do away with much of the friction of the ordinary thimble-skein, these rollers to be so arranged as to act independently of each other, thereby making each to perform its own rotary motion in its own particular position.

The fastening of the box or thimble $v$ to the hub $o$, and the spindle $c$ to the axle $k$, with the gutta-percha packing $a$, the gutta-percha to be dissolved to the consistency of thick tar and then spread upon the surface of the axle $k$ and the inner surface of the thimble or skein $c$. The thimble $c$ is then to be forced upon the axle to its proper place, aided by an iron bar inserted in a groove in the lower side of the axle and extending from one end of the axle to the other. The box $b$ is secured in the hub by the same process, with the addition of the flange $r$, which, after the box is forced to its place, is fitted onto the lower end of the box, and screwed to the hub by means of countersunk screws. By this means it will be impossible for the lubrication used upon the axle to penetrate or saturate the hub $o$ or the axle $k$, and will thereby add durability to the wood of the axle or hub.

The flanges $h$ and $r$, on the box $b$, by which strength is added to the axle and the oil is kept from the end of the hub $o$, also the friction between the flange $h$ and the shoulder $i$, will keep the lubricating substance in a condition to flow through the groove $l$.

The peculiar shape of the spindle $c$ and the box $b$, as shown in the drawing, giving it a greater amount of strength.

The spindle $c$ is fastened to the axle $k$ by means of the strap of iron $d$, running back the under side of the axle $k$ to the bolt $j$, or through the entire length of the axle, the spindle $c$ being drawn to its place and secured by means of the nut or burr $n$, the bar $d$ to be secured to the axle by means of bolts running through the axle and bar, or by clasps passing over the two, and secured by screws and nuts.

I am aware that thimbles or journal-boxes covering the entire axle have been known and used, and that spiral grooves or axles are not new; therefore I do not claim them, broadly; but What I do claim as my invention, and for which I desire to procure Letters Patent, is—

The peculiar construction of my axle-boxes or thimbles, with the flanges $h\,r$, oil-chamber $f$, and aperture $l$, when connected with a spiral groove terminating in a canal in which is placed friction-rollers $e$, the whole combined and operating as described.

HARMON G. WEIBLING.

Witnesses:
S. I. SORAH,
H. S. LATHROP.